US010059401B2

United States Patent
Yang et al.

(10) Patent No.: US 10,059,401 B2
(45) Date of Patent: Aug. 28, 2018

(54) DERAILLEUR APPARATUS FOR BICYCLES

(71) Applicant: Sun Race Sturmey-Archer Inc., Taoyuan (TW)

(72) Inventors: Chang-Yao Yang, New Taipei (TW); Chien-Chih Chang, Changhua County (TW)

(73) Assignee: SUN RACE STURMEY-ARCHER INC., Taoyuan (TW)

( * ) Notice: Subject to any disclaimer, the term of this patent is extended or adjusted under 35 U.S.C. 154(b) by 320 days.

(21) Appl. No.: 14/639,306

(22) Filed: Mar. 5, 2015

(65) Prior Publication Data

US 2015/0251726 A1  Sep. 10, 2015

(30) Foreign Application Priority Data

Mar. 5, 2014 (TW) .............................. 103107475 A

(51) Int. Cl.
*B62M 25/04* (2006.01)
*B62K 23/06* (2006.01)
*B62M 25/00* (2006.01)

(52) U.S. Cl.
CPC ............ *B62M 25/04* (2013.01); *B62K 23/06* (2013.01); *B62M 2025/003* (2013.01); *Y10T 74/20043* (2015.01)

(58) Field of Classification Search
CPC .............................. B62M 25/04; B62M 25/02; B62M 2025/003; B62K 23/06; Y10T 74/20043; Y10T 74/20438; Y10T 74/214
See application file for complete search history.

(56) References Cited

U.S. PATENT DOCUMENTS

| | | | | |
|---|---|---|---|---|
| 3,875,822 A | * | 4/1975 | Erith | B60T 7/102 254/DIG. 12 |
| 5,191,807 A | * | 3/1993 | Hsu | B62M 25/04 74/473.13 |
| 5,701,786 A | * | 12/1997 | Kawakami | B62K 23/06 74/489 |
| 5,873,286 A | * | 2/1999 | Van Lenten | B25B 13/463 74/575 |
| 5,957,002 A | * | 9/1999 | Ueng | B62K 23/06 74/142 |

(Continued)

FOREIGN PATENT DOCUMENTS

TW    315826    9/1997

*Primary Examiner* — Daniel D Yabut
(74) *Attorney, Agent, or Firm* — WPAT, PC

(57) ABSTRACT

A derailleur apparatus for bicycles includes a housing on a handle and a gearshift control assembly inside the housing. The gearshift control assembly has a first lever for cable-pulling, a ratchet assembly having a ratchet plate further having teeth, a second lever for cable-releasing, and an index claw. The first lever has a first pawl to keep the ratchet assembly at an initial position. The derailleur apparatus is characterized on that: the index claw further has a matching member and a second pawl, the second lever and the matching member form a first specific contact and a specific actuation relationship, and the second lever can move arbitrarily. While the second lever moves to form a second specific contact with the matching member, the index claw rotates to mesh the second pawl with the ratchet plate, such that the down-shift movement toward a second direction can be performed.

7 Claims, 9 Drawing Sheets

(56) References Cited

U.S. PATENT DOCUMENTS

| | | | | |
|---|---|---|---|---|
| 6,502,477 | B1* | 1/2003 | Assel | B62K 23/06 74/502.2 |
| 7,669,502 | B2* | 3/2010 | Kawakami | B62K 23/06 74/502.2 |
| 7,762,157 | B2* | 7/2010 | Kawakami | B62K 23/06 74/473.14 |
| 8,459,144 | B2* | 6/2013 | Kosaka | B62M 25/04 116/28.1 |
| 9,085,336 | B2* | 7/2015 | Kawakami | B62K 23/06 |
| 2002/0124678 | A1* | 9/2002 | Chen | B62K 23/06 74/502.2 |
| 2004/0025621 | A1* | 2/2004 | Chen | B62M 25/04 74/502.2 |
| 2007/0068316 | A1* | 3/2007 | Kawakami | B62K 23/06 74/502.2 |
| 2007/0151394 | A1* | 7/2007 | Kawakami | B62M 25/04 74/501.6 |
| 2007/0245847 | A1* | 10/2007 | Chen | B62K 23/06 74/502.2 |
| 2009/0173181 | A1* | 7/2009 | Watarai | B62K 23/06 74/502.2 |
| 2015/0259024 | A1* | 9/2015 | Kawakami | F16D 41/02 74/502.2 |

* cited by examiner

DERAILLEUR APPARATUS FOR BICYCLES

This application claims the benefit of Taiwan Patent Application Serial No. 103107475, filed Mar. 5, 2014, the subject matter of which is incorporated herein by reference.

BACKGROUND OF INVENTION

1. Field of the Invention

The invention relates to a derailleur apparatus for bicycles, and more particularly to the derailleur apparatus that is mounted on a handle of the bicycle for providing the rider a convenient gearshift (i.e. derailleur) manipulation while in riding.

2. Description of the Prior Art

Bicycles are good gears for both transportation and environmental protection. Especially for nowadays leisure lifestyle, outdoor activities to experience the nature atmosphere are the most relevant sport and health pastime to people. In particular, the derailleur bicycle is featured in adapting a derailleur apparatus to perform gearshifting so as to allow the rider to switch the maneuvering between a low gear for an uphill operation and a high gear for a downhill. Thereby, merits of saving labor for the uphill operation and saving time for the downhill operation can be easily achieved.

By having a Taiwan patent publication No. 315826 for example, the derailleur operating apparatus for bicycles is disclosed to be mounted on a handle of the bicycle and include at least a supportive member, a reeling member, a clutch mechanism, a releasing assembly, an engaging assembly and a transmission mechanism. The supportive member formed as a step-shaped pipe has a disc and a spindle extended upward from the disc. A bottom of the disc is fixed to the handle of the bicycle. The reeling member pivotally mounted at the spindle of the supportive member is to pull tightly or release a cable. The clutch mechanism including a meshing member is to be fixed by a fixation plate so as to pose the reeling member at a specific angle for being fixed further to the disc of the supportive member. The releasing assembly has a lower driving lever to disengage the clutch mechanism from the reeling member, such that the reeling member can be pivotally mounted at the spindle of the supportive member in a manner of releasing the cable by freely rotating the reeling member. The engaging assembly has an upper driving lever pivotally mounted at the spindle of the supportive member. The transmission mechanism has an actuated member connected fixedly with the upper driving lever for triggering the upper driving lever so as further to drive the transmission mechanism. Thereby, the reeling member is driven to rotate so as to pull tightly the cable. As the reeling member freely rotates to release the cable, the actuated member would stop temporarily the reeling member. Upon such an arrangement, the up-shift and low-shift respectively through the pulling and releasing the cable by the reeling member can be achieved by the co-movement of the lower driving lever, the clutch mechanism, the upper driving lever and the transmission mechanism.

The aforesaid patent disclosure is actually one kind of conventional gearshift manipulation apparatuses for bicycles, which is to perform the up-shift and low-shift respectively through the pulling and releasing the cable by the reeling member. However, in such a design of the conventional gearshift manipulation apparatus for bicycles, the driving lever is usually located at the grip of the bicycle for the rider. Therefore, while a rider shifts the gears, one of his/her hand needs to leave the grip so as able to push the upper or the lower driving lever, particularly along a single direction. Obviously, such a design make cumbersome for maneuvering the bicycle. Importantly, in a racing situation, the gearshift becomes a burden to the rider. For the rider's finger needs to stay at a position close to at the upper and the lower driving lever, stiffness upon this finger would be inevitable after a long term riding. As a consequence, the later-time gearshift operation would be significantly slowed due to the fatigue at the finger, and thus a unexpected loss in a racing due to the deferred gearshifting would be highly possible.

By having a Taiwan patent No. I286978 for another example, the derailleur apparatus for bicycles includes an installation portion on the bicycle, a reeling body, a position sustaining/releasing mechanism, an action member and an input member. The reeling body is located at the installation portion for pulling and releasing the cable. The position sustaining/releasing mechanism is to keep a cable stop selectively held at one of a plurality of gearshift positions. The action member is pivotally mounted the installation portion about a first axis. While the action member swings away from a neutral position so as to reach a gearshift position, the position sustaining/releasing mechanism would allow the reeling body to pull the cable. The input member constructed at the action member is to determine the swinging direction of the action member, either in a first direction or a second direction. upon such an arrangement, the rider can determine a favorite direction to operate the gearshifting.

Though a bi-directional gearshift operation can be provided by the aforesaid disclosure, yet the structuring of the derailleur apparatus is complicated and thus derailing sensitivity would be low due to the inevitable integrated mechanical tolerance. In addition, the production cost and the following maintenance expense would be hard to be reduced.

SUMMARY OF THE INVENTION

Accordingly, it is the primary object of the present invention to provide a derailleur apparatus for bicycles, which is featured in the location and structuring of the derailleur apparatus. By using less elements to provide the rider a free selection upon the direction of the down-shift movement and by introducing the design in considering the ergonomic human engineering, so more comfort can be provided to the rider for operating the up-shift or down-shift movement. Upon such an arrangement, the flexibility and the convenience in the gearshift manipulation can be enhanced. The derailleur apparatus for bicycles of the present invention includes an installation housing to be mounted on a handle of the bicycle and a gearshift control assembly installed inside the installation housing.

The gearshift control assembly has a movable first lever for controlling the cable-pulling, a ratchet assembly having a sidewall surface to mount a ratchet plate, a movable second lever for controlling the cable-releasing and an index claw. The ratchet plate of the ratchet assembly includes a plurality of teeth. The first lever has a first pawl for meshing one tooth of the ratchet assembly, so that the ratchet assembly can be kept at an initial position. The first lever can be pulled to move in a cable-pulling direction so as to have the first pawl to mesh another tooth of the ratchet plate, such that the ratchet assembly rotates about a first direction to perform the up-shift movement. The present invention is characterized on that: the index claw further has a matching member and a second pawl for meshing one tooth of the ratchet assembly, the index claw is connected with a return pin, one end of the second lever and the matching member form a first specific contact and keep a specific actuation relationship, and the direction for the second lever to move includes a plurality of different directions.

In the present invention, while the second lever is determined to move in a direction so as to form a second specific contact with the matching member, the index claw can be rotated to have the second pawl to mesh another tooth of the ratchet plate, such that the down-shift movement can be performed by having the ratchet assembly to rotate toward a second direction.

In accordance with the present invention, the down-shift mechanism that can meet the ergonomic human engineering and allow the rider to freely select the operational direction can be provided to enhance the flexibility, the sensitivity and the convenience in the gearshift manipulation, so that various applicable manifolds for both the bicycles and the riders can be achieved.

All these objects are achieved by the derailleur apparatus for bicycles described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a derailleur apparatus for bicycles. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1A:
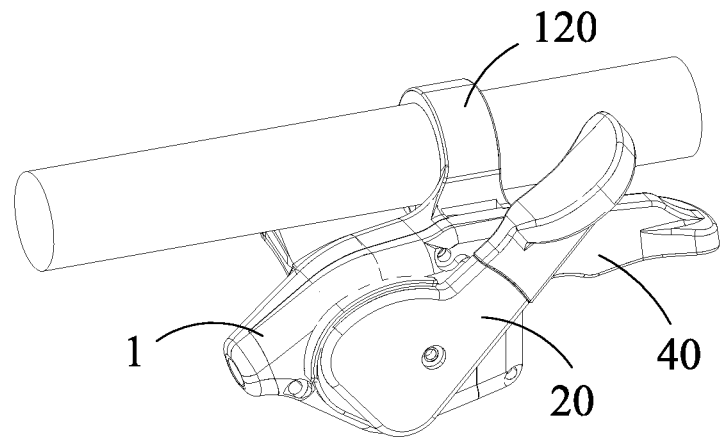
FIG. 1A is a schematic perspective view of the preferred derailleur apparatus for bicycles in accordance with the present invention, in an assembly state on a handle.
Figure 1B:
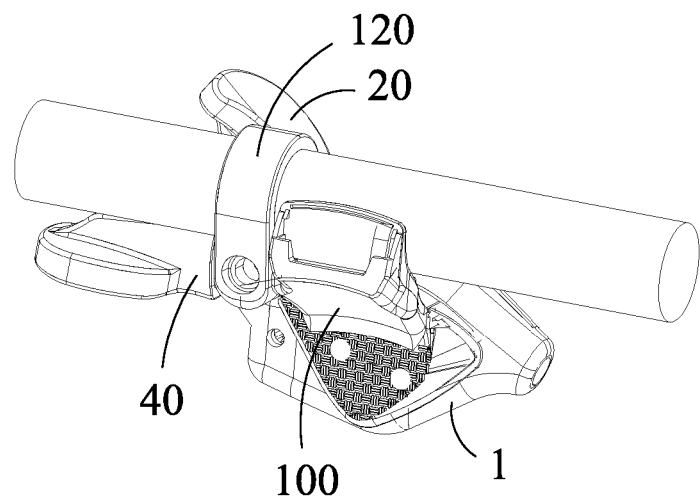
FIG. 1B is another view of FIG. 1A.
Figure 2A:
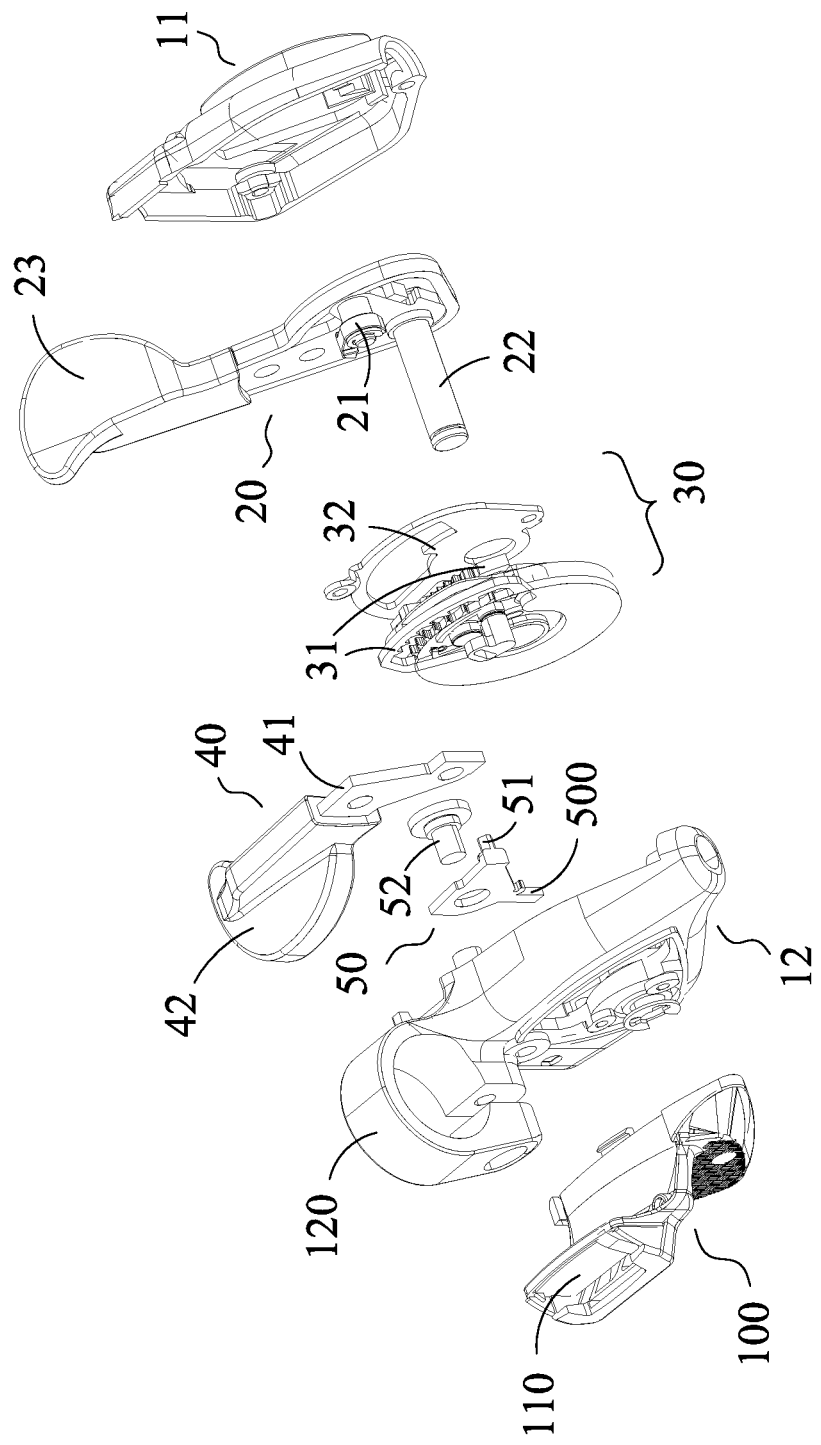
FIG. 2A is a schematic exploded view of the preferred derailleur apparatus for bicycles in accordance with the present invention.

Refer now to FIG. 1A, FIG. 1B and FIG. 2A, in which FIG. 1A is a schematic perspective view of the preferred derailleur apparatus for bicycles in accordance with the present invention, in an assembly state on a handle, FIG. 1B is another view of FIG. 1A, and FIG. 2A is a schematic exploded view of the preferred derailleur apparatus for bicycles in accordance with the present invention.

As shown in FIG. 1A, FIG. 1B and FIG. 2A, the derailleur apparatus for bicycles of the present invention is shown. The object of the present invention is largely featured in the mechanism and the structuring for down-shifting operation of the derailleur apparatus. By providing the following embodiments, details of the present invention can then be well elucidated. In the following description, an initial position is defined as the state of the derailleur apparatus prior to a down-shift movement. As shown, the derailleur apparatus includes an installation housing 1 and a gearshift control assembly 2, and further includes a gear position display assembly 100.

The installation housing 1 has a first casing 11 and a second casing 12, by which these two casings 11 and 12 form an accommodation room in between. A clamp 120 formed exteriorly to the second casing 12 is to mount the derailleur apparatus onto a handle of the bicycle by sleeving.

The gearshift control assembly 2 includes a first lever 20, a ratchet assembly 30, a second lever 40 and an index claw 50.

Figure 2B:
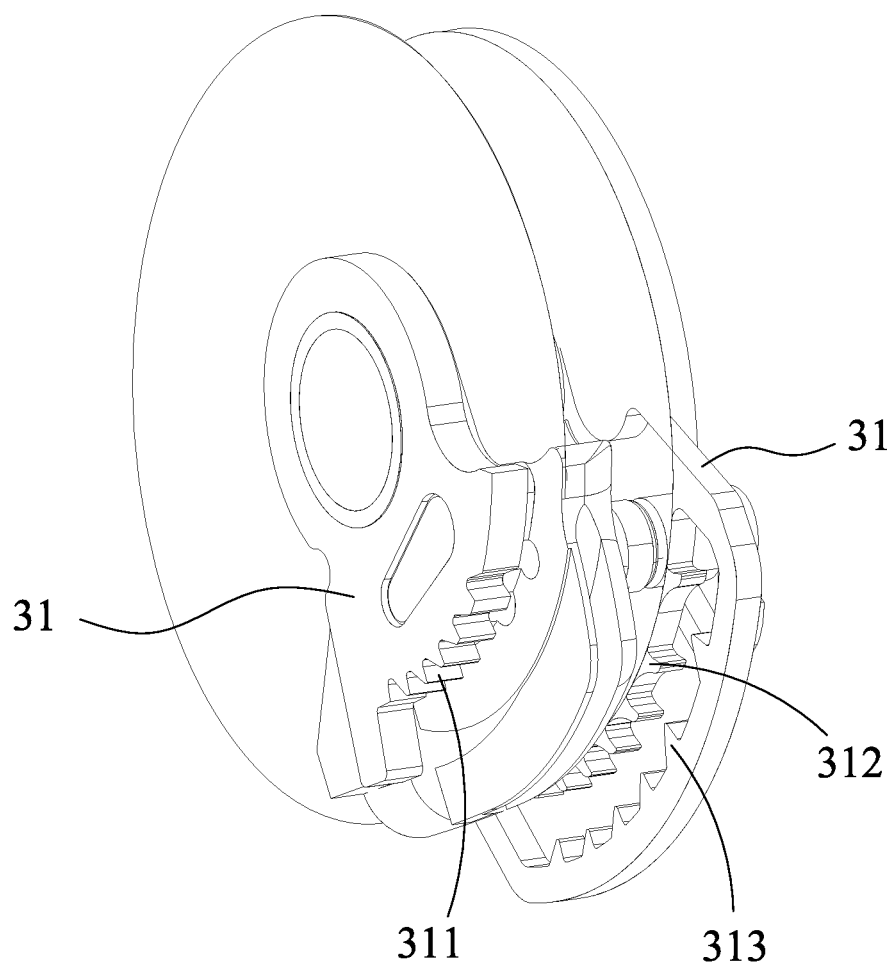
FIG. 2B is a schematic perspective view of the ratchet plate of the ratchet assembly in accordance with the present invention.
Figure 3A:
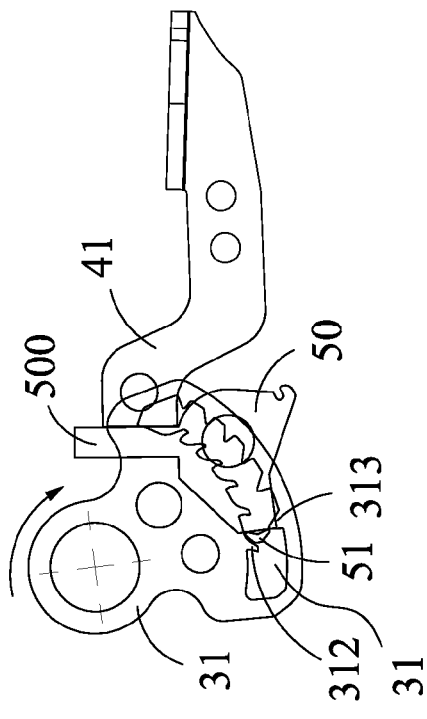
FIGS. 3A~3D show orderly states of the down-shift mechanism in a cable-releasing operation in accordance with the present invention.
Figure 3C:
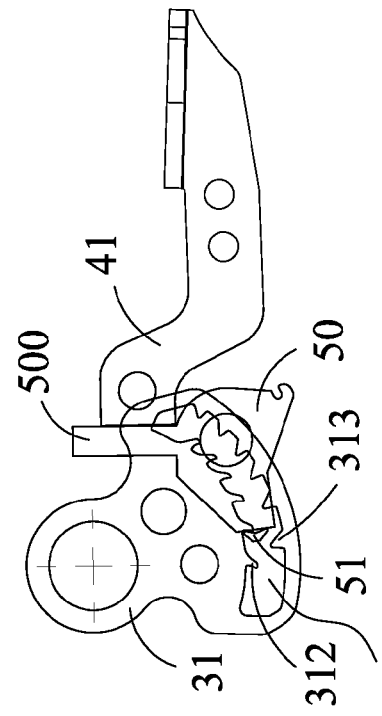
Figure 3B:
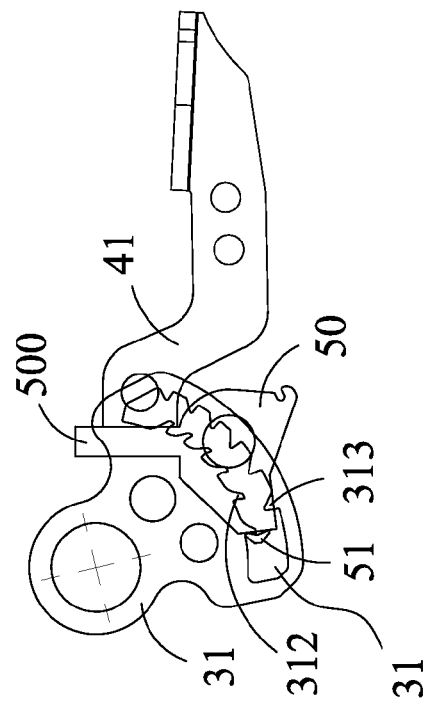
Figure 3D:
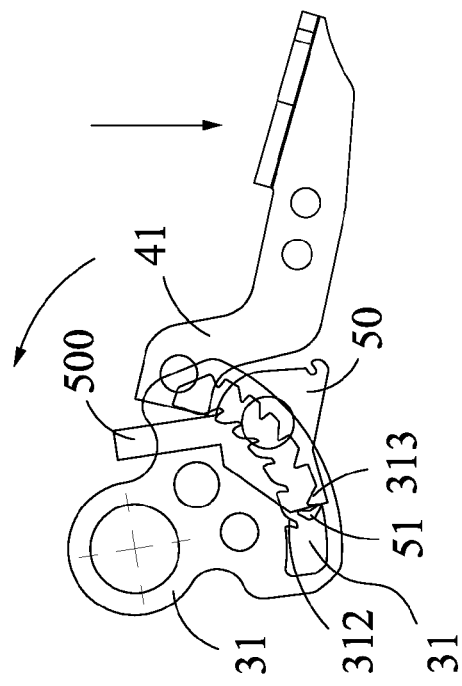

Referring to FIG. 2A and FIG. 2B, the ratchet assembly 30 mounted inside the accommodation room has surface holes and includes a ratchet plate 31 and a depressing plate 32, in which the ratchet plate 31 can be selectively mounted to a surface of the ratchet assembly, or along an exterior sidewall of the ratchet assembly 30, and the depressing plate 32 is located close to a side of the ratchet plate 31. The sidewall of the ratchet plate 31 has a plurality of teeth. These teeth can be up-shift index teeth 311, down-shift index teeth 312 and down-shift pause teeth 313 with respect to the down-shift index teeth 312. In the present invention, each of the aforesaid teeth is disposed with the sidewall by a respective angle.

The first lever 20 is a movable rod member for controlling the cable-pulling. A portion of this rod member is located inside the accommodation room. One end of the rod member (the end inside the accommodation room) is to form a first pawl 21 and a first lever pivot 22, while another end thereof is to form a first lever pad 23 located outside of the accommodation room. While the first lever 20 is at an initial position, the first pawl 21 and the depressing plate 32 are engaged, and the first lever pivot 22 penetrates the respective hole on the ratchet assembly 30 to connect the second casing 12. Further, the ratchet assembly 30 is usually posed at the initial position. While a rider applies a force to the first lever pad 23 along a direction, the first lever 20 would be driven to rotate about a central axial direction of the first lever pivot 22 so as to disengage the first pawl 21 from the depressing plate 32, and further to mesh one of the up-shift index teeth 311. Thereby, the ratchet assembly 30 is driven to rotate in a first direction to perform an up-shift movement, and then the first lever 20 can resume back to the initial position by appropriate spring forcing so as to have the first pawl 21 to disengage the up-shift index teeth 311 and back to mesh the depressing plate 32. In the present invention, the first direction for the derailleur apparatus can be determined individually by the position of the handle of the bicycle, which can be a clockwise direction or a counter clockwise direction.

The index claw 50 formed as a plate member having holes is connected with a return pin 52, in which the return pin 52 can be a pin member having relevant torsion or compression springs. By having the return pin 52 to penetrate the hole on the index claw 50 and to further connect the second casing 12. In the present invention, the return pin 52 is introduced to drive the index claw 50 back to its initial position. One end of the index claw 50 forms a second pawl 51 extending toward the ratchet plate 31 so as to mesh one tooth of the down-shift index teeth 312 of the ratchet plate 31. Further, the index claw 50 has a matching member 500 located at a specific position as shown in FIG. 2A.

The second lever 40 is a movable rod member to control the cable-releasing in at least two different directions. A portion of the rod member is located inside the accommodation room and is formed as a pivotal arm 41, in which the pivotal arm 41 can be, but not limited to, a plate type structure or a pillar type structure, while another end of the second lever 40 (the end outside the housing 1) is formed as a second lever pad 42.

The gear position display assembly 100 mounted outside but connected with the second casing 12 has a display portion 110. In the present invention, the display can be a scale panel, a digital panel or any the like.

Refer now to FIGS. 3A~3D, in which consequent states of the down-shift mechanism in a cable-releasing operation in accordance with the present invention are shown.

As shown in FIGS. 3A~3D, a portion of the pivotal arm 41 at the initial position can form a first specific contact with the matching member 500, and a specific actuation relation is formed in between as well. The specific actuation relation would be detailed by embodiments as follows. The rider can selectively apply external forcing in different directions onto the second lever pad 42, in which the direction can be a clockwise direction or a counter clockwise direction. The second lever 40 then is rotated parallel to the central axial direction, so as to have the pivotal arm 41 to move the matching member 500 by a second specific contact formed in between. The index claw 50 is simultaneously pushed away from the initial position, and the second pawl 21 disengages the original-meshing tooth and then engages one of the down-shift pause teeth 313 of the ratchet plate 31, such that a temporary stop is formed. For the special slope design between the down-shift pause teeth 313 and the second pawl 51, the second pawl 51 would slide along the surface of the depressing plate 313 till a complete separation in between, as the ratchet assembly 30 gradually rotates around the second direction. When the index claw 50 is back to the initial position so as to have the second pawl 51 to mesh another tooth of the down-shift index teeth 312, a complete down-shift movement is finished. Further, the aforesaid specific position can be, but not limited to, the contact position of the matching member 500 and the portion of the pivotal arm 41, a position at the index claw 50a, or a plurality of positions thereon. Also, the aforesaid first direction and second direction can be opposing directions for cable-pulling and for cable-releasing.

Figure 4A:
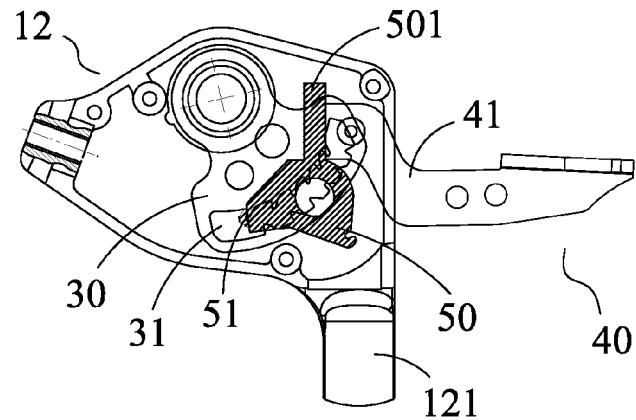
FIGS. 4A~4C show various states of a portion of a first embodiment of the down-shift mechanism in a cable-releasing operation in accordance with the present invention, schematically in an operational order.
Figure 4B:
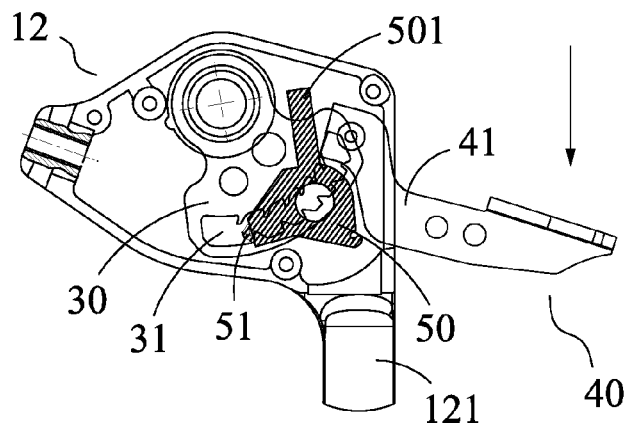
Figure 4C:
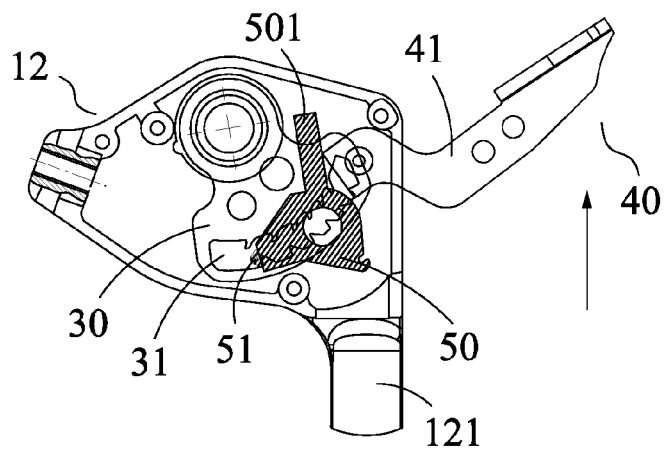

Refer now to FIGS. 4A~4C, in which consequent states of a portion of a first embodiment of the down-shift mechanism in a cable-releasing operation in accordance with the present invention are shown schematically in an operational order.

As shown in FIGS. 3A~3D and FIGS. 4A~4C, the first embodiment of the down-shift mechanism for the derailleur apparatus of the present invention is shown. In this embodiment, the matching member 500 is formed as a protrusive block 501 extending outward from a body of the index claw 50. The protrusive block can be a rod member or a plate member. The aforesaid first specific contact is a surface contact relationship between the complete sidewall of the pivotal arm 41 away from the second lever pad 42 and an exterior sidewall of the protrusive block 501. The second specific contact is a point contact relationship between an end point of the pivotal arm 41 away from the second lever pad 42 and an end point of the matching member 500. The specific actuation relationship is the forcing selectively applied in a specific direction. As shown in FIG. 4B, the forcing from the second lever 40 is in a clockwise direction, while, in FIG. 4C, the forcing from the second lever 40 is in a counter clockwise direction. Either of the aforesaid two forcing can have the pivotal arm 41 to apply point contact at the index claw 50, so as to allow the second pawl 51 originally meshing one tooth of the down-shift index teeth 312 to disengage gradually from the meshed tooth. As the protrusive block 501 and an end surface of the pivotal arm 41 form an oblique contact right before a complete separation, the second specific contact is formed. Then, the ratchet assembly 30 generates a rotation about the second direction, and further, under a depression from the return pin 52, the index claw 50 rotates toward the initial position and drives the second pawl 51 and the down-shift pause teeth 313 to separate gradually. Till when the pivotal arm 41 and the index claw 50 are back to the state of the first specific contact, the second pawl 51 is then to mesh another tooth of the up-shift index teeth 312, and the down-shift movement is finished.

Figure 5A:
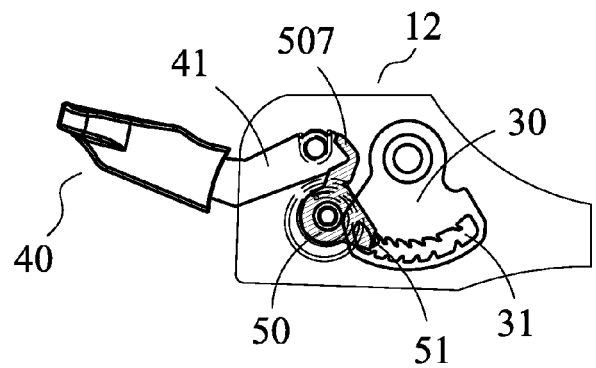
FIGS. 5A~5C show various states of a portion of a second embodiment of the down-shift mechanism in a cable-releasing operation in accordance with the present invention, schematically in an operational order.
Figure 5B:
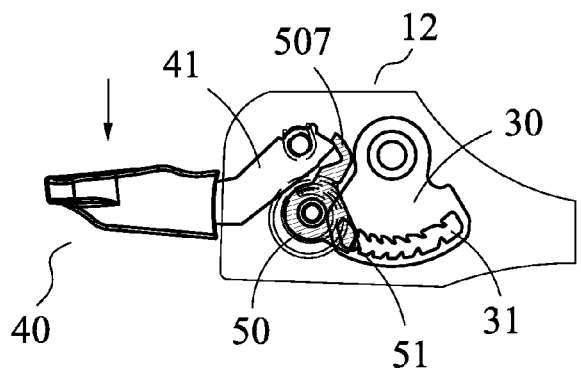
Figure 5C:
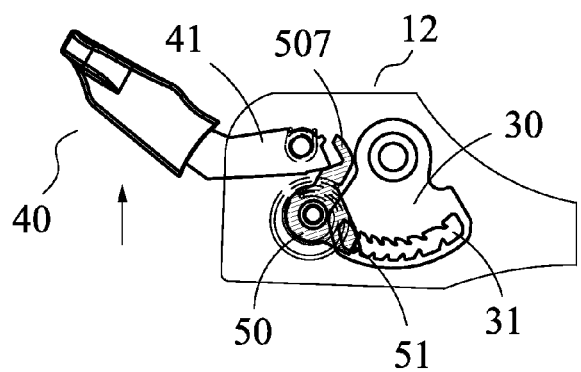

Refer now to FIGS. 5A~5C, in which consequent states of a portion of a second embodiment of the down-shift mechanism in a cable-releasing operation in accordance with the present invention are shown schematically in an operational order.

As shown in FIGS. 4A~4C and FIGS. 5A~5C, the second embodiment of the down-shift mechanism for the derailleur apparatus of the present invention is shown. In this embodiment, only the difference between the current embodiment and the first embodiment is explained. Also, the similar elements in between would be assigned by the same numbers. Further, in the figures, only the difference in between is clearly shown, and the similar portions in between would be simplified.

In this second embodiment, the matching member 500 of the index claw 50 is formed as an extending arm 507 outward extending and having a concave portion to act against an external sidewall of the pivotal arm 41. The down-shift movement of the second embodiment is resembled to that of the first embodiment, and thus would be omitted herein. The first specific contact herein is the surface contact relationship between the complete sidewall at a side of the pivotal arm 41 and the sidewall of the concave portion of the extending arm 507. The second specific contact is the point contact relationship between an end point of the pivotal arm 41 and the corresponding contact point at the concave portion of the extending arm 507. Also, in the first specific contact, the concave portion and the sidewall at a side of the pivotal arm 41 engage together.

Figure 6A:
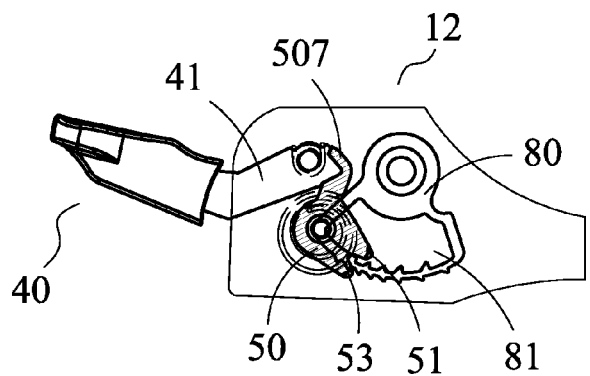
FIGS. 6A~6C show various states of a portion of a third embodiment of the down-shift mechanism in a cable-releasing operation in accordance with the present invention, schematically in an operational order.
Figure 6B:
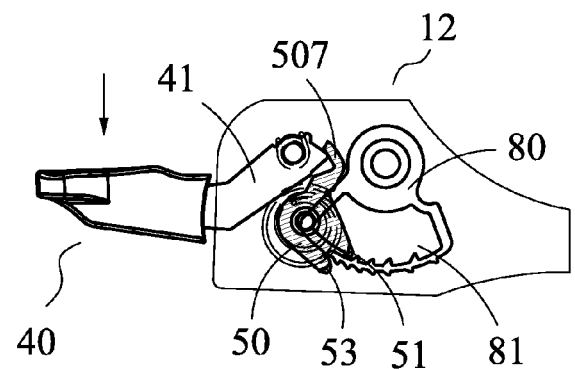
Figure 6C:
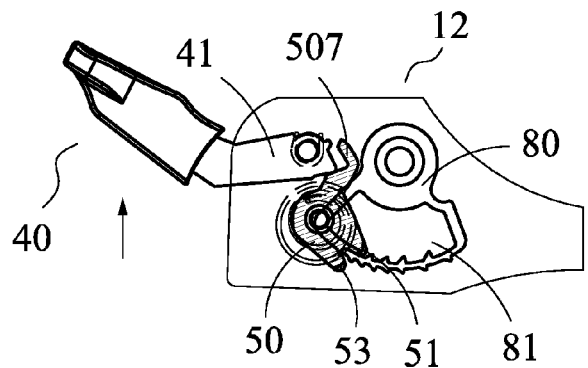

Refer now to FIGS. 6A~6C, in which consequent states of a portion of a third embodiment of the down-shift mechanism in a cable-releasing operation in accordance with the present invention are shown schematically in an operational order.

As shown in FIGS. 3A~3D, 5A~5C and 6A~6C, the third embodiment of the down-shift mechanism for the derailleur apparatus of the present invention is shown. In this embodiment, only the difference between the current embodiment and the first embodiment is explained. Also, the similar elements in between would be assigned by the same numbers. Further, in the figures, only the difference in between is clearly shown, and the similar portions in between would be simplified.

In this embodiment, the major difference between this current embodiment and the first embodiment is that the ratchet assembly 80 of this derailleur apparatus has an arc-shaped ratchet plate 81, and a plurality of teeth are formed along both the internal sidewall and the external sidewall of the arc-shaped ratchet plate 81.

In addition, another difference between this current embodiment and the first embodiment is that the index claw 50 herein further has a third pawl 53. When the ratchet assembly 80 is at the initial position, the third pawl 53 is positioned by meshing one tooth of the down-shift index teeth 312. While in performing the down-shift movement, the third pawl 53 disengages the original-meshed tooth, the second pawl 51 engages one tooth of the down-shift pause teeth 313 located at another side of the ratchet plate 81 so as to form temporary stop. Thereafter, as the forcing on the second lever 40 is released, the index claw 50 would be back to the initial position, then the second pawl 51 would disengage the down-shift pause teeth 313, the third pawl 53 would be shifted to mesh a next tooth of the down-shift index teeth 312, such that a down-shift movement is performed. In the accompanying figures, though two pawls and the meshed teeth are relatively shown, yet the relationship among the second pawl 51, the third pawl 53 and the ratchet plate 81 shall not be limited to these illustrations.

Figure 7A:
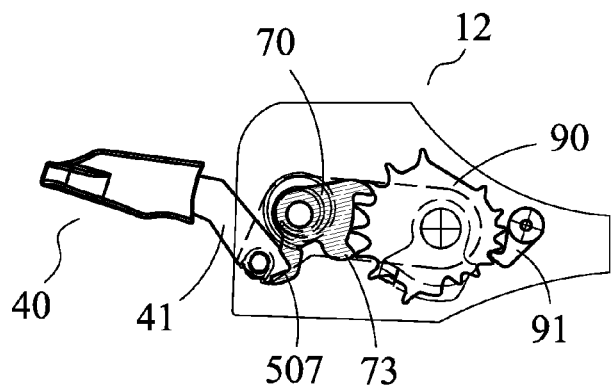
FIGS. 7A~7C show various states of a portion of a fourth embodiment of the down-shift mechanism in a cable-releasing operation in accordance with the present invention, schematically in an operational order.
Figure 7B:
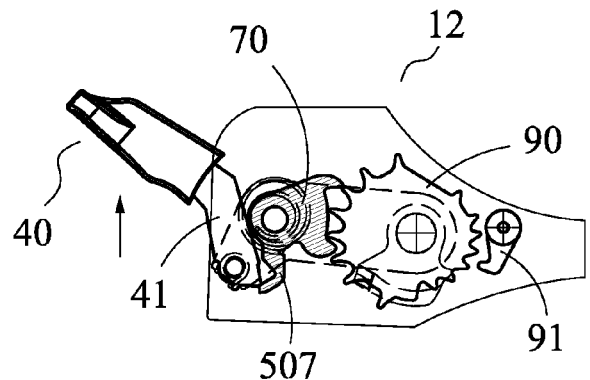
Figure 7C:
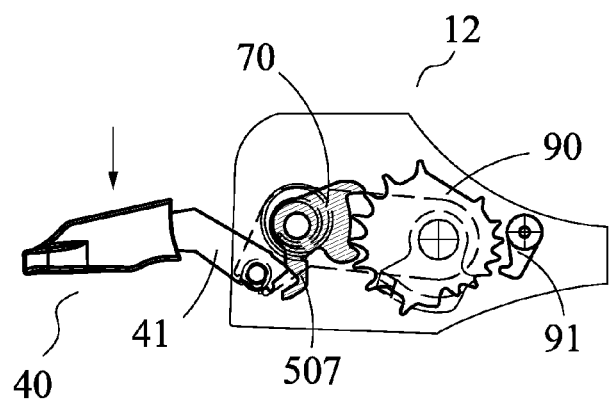

Refer now to FIGS. 7A~7C, in which consequent states of a portion of a fourth embodiment of the down-shift mechanism in a cable-releasing operation in accordance with the present invention are shown schematically in an operational order.

As shown in FIGS. 7A~7C, the fourth embodiment of the down-shift mechanism for the derailleur apparatus of the present invention is shown. In this embodiment, only the difference between the current embodiment and the first embodiment is explained. Also, the similar elements in between would be assigned by the same numbers. Further, in the figures, only the difference in between is clearly shown, and the similar portions in between would be simplified.

In this embodiment, the major difference between this current embodiment and the first embodiment is that a plurality of teeth is formed along the sidewall of the ratchet assembly 90, which is formed as a ratchet plate, and the installation housing 1 neighboring the ratchet assembly 90 further includes a depressing plate 91 swing-able within a limited range. One end of the depressing plate 91 is, but not limited to, hooked to the corresponding tooth member. The major function of the depression plate 91 is to restrain the rotation of the ratchet assembly 90 in the second direction.

In addition, another difference between this current embodiment and the first embodiment is that the index claw 70 herein has a second pawl 71 and a third pawl 73, in which a vice clamp pattern is formed between the first or second pawls (71/72) and the index claw 70.

While the ratchet assembly 90 is at the initial position, the second pawl 71 meshes one tooth of the ratchet assembly 90, and the depressing plate 91 and the tooth at an opposing side are meshed to form a stop. While in performing the down-shift movement, the second pawl 71 and the depressing plate 91 disengage respectively the original meshed teeth, and the third pawl 73 meshes another tooth so as to complete the down-shift movement. Though the figures demonstrate the relative positions of the two pawls and the meshed teeth at the initial position, yet the position relationship in between shall not be limited to these illustrations.

Figure 8A:
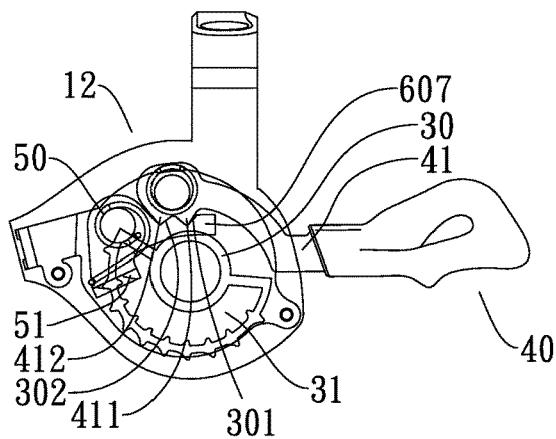
FIGS. 8A~8C show various states of a portion of a fifth embodiment of the down-shift mechanism in a cable-releasing operation in accordance with the present invention, schematically in an operational order.
Figure 8B:
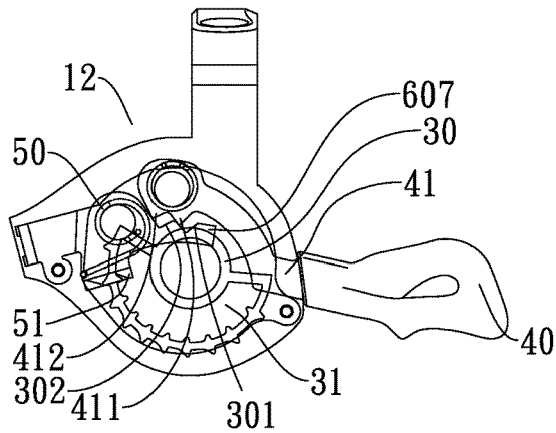
Figure 8C:
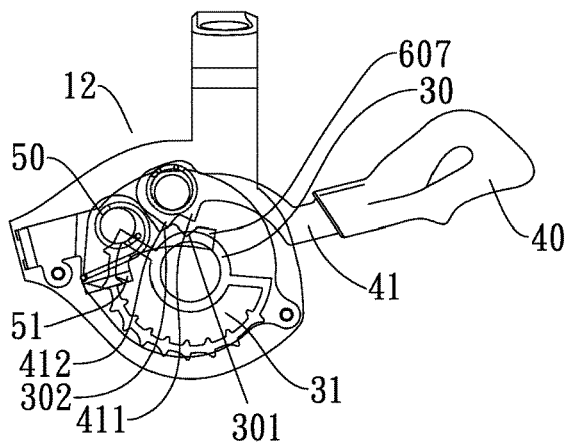

Refer now to FIGS. 8A~8C, in which consequent states of a portion of a fifth embodiment of the down-shift mechanism in a cable-releasing operation in accordance with the present invention are shown schematically in an operational order. In this embodiment, only the difference between the current embodiment and the first embodiment is explained. Also, the similar elements in between would be assigned by the same numbers. Further, in the figures, only the difference in between is clearly shown, and the similar portions in between would be simplified.

In this fifth embodiment, the matching member 500 is formed as a protrusive rod 607. The protrusive rod 607 includes a first concave portion 301 and a second concave portion 302. One sidewall of the pivotal arm 41 further includes a first convex portion 411 and a second convex portion 412 to match respectively the first concave portion 301 and the second concave portion 302. The downshift movement of this fifth embodiment is resembled to that of the aforesaid second embodiment shown in FIGS. 5A~5C, and thus details thereabout are omitted herein. As shown in FIG. 8A, the aforesaid first specific contact is a surface contact relationship between the sidewall of the pivotal arm 41 and the exterior sidewall of the protrusive rod 607, through the matching of the first convex portion 411 and the second convex portion 412 to the first concave portion 301 and the second concave portion 302, respectively.

The second lever 40 can be operated bi-directionally. While the second lever 40 is determined to displace in a specific direction, the second specific contact can then be formed with the protrusive rod 607. The operational direction of the second lever 40 can be up to rider's favor, either in a clockwise direction or a counter clockwise direction. As shown in FIG. 8B, the operational direction of the second lever 40 is a clockwise direction. Thus, the second specific contact is a point contact relationship between the first convex portion 411 of the pivotal arm 41 and a sidewall of the first concave portion 301 of the protrusive rod 607, defined further by a first torque. As shown in FIG. 8C, the operational direction of the second lever 40 is a counter clockwise direction. Thus, the second specific contact is a point contact relationship between the second convex portion 412 of the pivotal arm 41 and a sidewall of the second concave portion 302 of the protrusive rod 607, defined further by a second torque equal to the first torque.

Upon such an arrangement, the rider can arbitrarily select the operational direction to perform the downshift movement. For the first torque and the second torque to actuate the second lever 40 are the same, no further difficulty in operational forcing and angling can be induced to the rider no matter whether the operation pattern of FIG. 8B or the FIG. 8C he/she chooses.

In addition, except for the rider can choose arbitrarily the operational direction according to his/her personal favor, the operational forcing and angling are further designed to be equal or even unequal, in particular to meet rider's requirement, and thus the riding comfort and convenience can be greatly enhanced.

In summary, the derailleur apparatus for bicycles in accordance with the present invention provides various types of the down-shift mechanisms. While in a down-shift movement, the present invention introduces the design in considering the ergonomic human engineering so as to provide more comfort to rider's hand by utilizing the thumb to perform the up-shift movement. In addition, for the index finger itself can provide freely bending, so the rider can freely select any of the two opposing directions to perform the down-shift movement. Further, to meet various applications of the bicycles and different riders, the present invention provides a down-shift mechanism with a better pairing of the angular displacements and the sensitivity, such that the flexibility and the convenience in the gearshift manipulation can be enhanced in various applicable manifolds for both the bicycles and the riders.

While the present invention has been particularly shown and described with reference to a preferred embodiment, it will be understood by those skilled in the art that various changes in form and detail may be without departing from the spirit and scope of the present invention.

What is claimed is:

1. A derailleur apparatus for bicycles, comprising:
   an installation housing, installed on a handle of a bicycle; and
   a gearshift control assembly, installed inside the installation housing, comprising:
      a movable first lever, comprising:
         a first pawl, for an up-shift movement with cable-pulling; and
         a first lever pivot;
      a ratchet assembly, comprising a ratchet plate, wherein said ratchet plate has up-shifting index teeth and down-shift index teeth, said ratchet plate is disk shaped with a first side and a second side, said up-shifting index teeth is positioned at said first side with a radial direction, and said down-shifting index teeth is positioned at said second side with said radial direction, and said first lever pivot penetrates said ratchet assembly;
      a movable second lever for cable-releasing;
      a return pin; and
      an index claw with a second pawl and a matching member;
      wherein said first pawl engages said up-shifting index teeth, and said ratchet assembly rotates toward a first direction to perform an up-shift movement while said first lever is moved in a cable-pulling direction;
   wherein said second pawl engages said down-shifting index teeth, the index claw is connected with said return pin and pivoting around said return pin, and said second lever performs a down-shifting movement by pushing said matching member to pivot said index claw around said return pin and to move said second pawl and having the ratchet assembly to rotate toward a second direction;
   wherein said second lever moves in a clockwise direction and a counter clockwise direction and has two convex portions, said matching member has two concave portions respectively matching said two convex portions, said two convex portions move out of said two concave portions when said second lever moves in said clockwise direction, and said two convex portions move out of said two concave portions when said second lever moves in said counter clockwise direction.

2. The derailleur apparatus for bicycles of claim 1, wherein, while the ratchet assembly is at the initial position, said second lever pivots to push said matching member for performing the down-shift movement.

3. The derailleur apparatus for bicycles of claim 1, wherein the first direction and the second direction are opposing directions.

4. The derailleur apparatus for bicycles of claim 1, wherein said index claw further comprises a hole, said return pin is a spring pin penetrating said hole and further connecting to said installation housing, and said return pin drives said index claw back to an initial position.

5. The derailleur apparatus for bicycles of claim 1, wherein said ratchet plate further comprises a down-shift pause teeth, said index claw further comprises a third pawl engaging with said down-shift pause teeth; and
   wherein, said down-shift movement is performed as following:
      said second pawl disengages with said down-shift index teeth and said third pawl engages with said down-shift pause teeth;
      moving said index claw back to an initial position; and
      said second pawl engages with said down-shift index teeth and said third pawl disengages with said down-shift pause teeth.

6. The derailleur apparatus for bicycles of claim 1, wherein said ratchet assembly further comprises a depressing plate positioned between said ratchet plate and said first lever, and said depressing plate has a slot;
   wherein said first pawl penetrates said slot to engages with said up-shift index teeth, and said depression plate restrains rotations of said ratchet assembly in said second direction.

7. The derailleur apparatus for bicycles of claim 1, further comprising a gear position display assembly mounted on said installation housing, wherein said gear position display assembly has a display portion being one of a scale panel and a digital panel.

* * * * *